United States Patent Office 3,498,913
Patented Mar. 3, 1970

3,498,913
USE OF CATIONIC RESINS IN COAGULATING
POLYMERIC MATERIALS
Lucien Sellet, Saddle River, N.J., assignor to Diamond
Shamrock Corporation, Cleveland, Ohio, a corporation
of Delaware
No Drawing. Continuation-in-part of application Ser. No.
619,573, Mar. 1, 1967. This application Apr. 1, 1968,
Ser. No. 718,000
Int. Cl. C02b 1/20
U.S. Cl. 210—54                    8 Claims

ABSTRACT OF THE DISCLOSURE

Stable cationic resins which are condensation products of (a) formaldehyde with (b) reaction products of (1) amino bases and (2) methylolated amine salts are useful in processes for coagulating polymeric materials from an aqueous dispersion. These resins can be dried from aqueous solutions without materially affecting their water solubility and molecular structure. A typical resin used in coagulating polymeric materials from an aqueous dispersion is the condensation product of formaldehyde with the reaction product of dicyandiamide and methylolated ammonium sulfate.

CROSS-REFERENCES TO RELATED APPLICATIONS

This application is a continuation-in-part of copending application Ser. No. 619,573—Sellet, filed Mar. 1, 1967, now U.S. Patent No. 3,410,649, which in turn is a continuation-in-part of application Ser. No. 281,050—Sellet, filed May 16, 1963, now abandoned.

BACKGROUND OF THE INVENTION

The present invention relates to processes using cationic resins in coagulating polymeric materials from aqueous dispersions. More particularly, the present invention relates to the use of cationic, water stable resins as coagulants for polymeric materials from aqueous dispersions, said resins being the condensation products of amino bases reacted with methylol amine salts and formaldehyde.

In general, cationic resins produced by condensing an amino base such as dicyandiamide with formaldehyde have suffered from the disadvantage that they are not stable in water and are easily polymerized to their water insoluble state. Therefore one of the great drawbacks in the commercial application of these cationic resins is their limited stability, in water, especially under slightly acidic conditions which encourage condensation and polymerization of these resins when they are in an aqueous medium. For example, in the rubber latex industry, the lack of stability and subsequent change in physical and chemical properties of these resins, especially due to the presence of acidic surface active agents or dispersants in the water medium, seriously detract from the use of these cationic resins as coagulating agents for latex. In many cases, these resins produce undesirable side effects which are difficult to control and often cannot be controlled at all.

Another disadvantage of these resin condensates is that they are also easily polymerized to their water insoluble stage by the application of heat. Hence it has been almost impossible to easily dry water solutions containing these materials by such conventional means of applying heat as through spray drying or by oven or drum drying without materially affecting the water solubility and the structure of these condensed products. This has been extremely disadvantageous due to the fact that these resin condensates are prepared in water solutions.

An object of this invention is to provide a process for coagulating polymeric materials from an aqueous dispersion wherein water soluble cationic resin condensates which have increased cationic properties as compared to amino base-formaldehyde condensates and which are also stable in aqueous media even under acidic conditions are added to the dispersion. A further object is to provide a process for coagulating an aqueous dispesion containing a latex and an anionic surfactant. Another object is to provide a process for coagulating acrylonitrile latex. Other objects of this invention will become apparent from the detailed description given herein. However, it is intended that the detailed description and specific examples do not limit this invention, but merely indicate preferred embodiments.

SUMMARY OF THE INVENTION

A process using cationic resins for coagulating polymeric materials from aqueous dispersions has been discovered. It has been found that water stable, highly cationic resins are useful as coagulants for polymeric materials from aqueous dispersions. These cationic resins can be produced by condensing formaldehyde with an amino base, such as dicyandiamide, ammeline, guanamines, guanidine and melamine, the amino base having been previously reacted with the reaction product of formaldehyde and a nitrogen containing compound selected from the group consisting of substituted and unsubstituted alkyl mono-amine salts of carboxylic acids and inorganic mineral acids, said amine having at least one reactive hydrogen atom attached to the nitrogen atom of said amine, and ammonium salts of inorganic mineral acids and carboxylic acids. I have found that these cationic resins are soluble in water and do not polymerize or condense even under acidic conditions or through the application of heat. Furthermore, the very strong cationic properties of these cationic resins make them particularly useful in precipitating or inactivating anionic polymers and in breaking resin and rubber emulsions or dispersions especially when anionic dispersants or anionic emulsifiers are present.

The cationic resins used in the process of this invention are prepared by first reacting approximately one mole of a nitrogen containing salt selected from the group consisting of ammonium salts of inorganic mineral acids and carboxylic acids and an alkyl mono-amine salts of inorganic mineral acids and carboxylic acids containing at least one reactive hydrogen attached to the nitrogen atom of the amine group, with a sufficient amount of formaldehyde to react with one of the active hydrogens on all of the nitrogen atoms contained within said salt. In this manner, the methylol amine salt is initially formed. This methylol amine salt is then next reacted with an amino base such as dicyandiamide, guanidine, guanamines, ammeline and melamine, the amino base being present in an amount sufficient to react with the total amount of the reactive methylol groups contained within the amine salt. Finally this reaction product is reacted with at least one mole of formaldehyde per mole of this reaction product to form the cationic resin.

The first stage in the preparation of the cationic resin is carried out by reacting a salt of a nitrogen containing compound selected from the group consisting of an alkyl mono-amine salt having at least one active hydrogen attached to the nitrogen atom and an ammonium salt with formaldehyde. This reaction is preferably carried out in the presence of water. The alkyl mono-amine salt which may be utilized in accordance with this invention includes any inorganic mineral acid salt or any monocarboxylic acid salt of primary or secondary mono-amines. Examples of suitable primary or secondary mono-amines which can be used in accordance with this invention include lauryl amine, ethyl amine, diethyl amine, methyl amine, propylamine, ethanol amine, 3-amino propanol, isopropanol amine, dioctyl amine, stearyl amine, dicapryl amine, methyl lauryl amine, methyl soya amine, etc. These amines may be treated with an organic acid or an inorganic mineral acid to prepare the salts thereof. Suitable acids include hydrochloric acid, sulfuric acid, phosphoric acid, boric acid, formic acid, acetic acid, propionic acid, butyric acid, etc. Ammonium salts can be used in lieu of the amine salts in preparing the cationic resins of this invention. These ammonium salts include ammonium chloride, ammonium formate, ammonium acetate, ammonium borate, ammonium sulfate, ammonium nitrate, ammonium phosphate, etc.

The molar proportion of formaldehyde which is reacted with the salt of the nitrogen containing compound to form the methylolated amine salt will obviously vary depending upon the number of primary or secondary amine groups or ammonium groups contained within a mole of the salt of the nitrogen containing compound. The proportions should be such that all of the reactive ammonium groups or primary or secondary amine groups within the salt are reacted with formaldehyde. Preferably, in forming the methylolated amine salt, it is desirable to provide a reaction mixture with the ratio of about one mole of formaldehyde for every ammonium or reactive amine group contained within the salt. This reaction is preferably carried out at temperatures within the range of 50° to about 80° C. Higher or lower temperatures may be used but when using temperatures of above 80° C., care should be taken so as to avoid undesirable side reactions. Also, the time of the reaction will vary in different cases, depending upon the temperature, the time being usually in the range of about 0.25 hour to 2.5 hours.

The second stage of the preparation of cationic resins useful in this invention is to react, preferably in the presence of water, the methylolated amine salt with an amino base such as dicyandiamide, guanidine, ammeline, guanamine and melamine to produce an amino base complexed salt. By this reaction, amine salt groups are introduced into the amino base by means of the methylol groups reacting with the functional amino groups on the amino base, thereby eliminating water. In carrying out this reaction, molar proportions of about one or more, preferably from 1 to 10, moles of the methylolated amine salt per mole of the amine base should be utilized to form the amino base salt depending on the amount of functional amino groups contained within the amino base. This reaction is preferably carried out at temperatures of from about 50° to about 100° C. Also the time of the reaction will vary in different cases, the time being usually in the range of from about 0.25 hour to about 10 hours. As is well known, the time may be decreased by increasing the temperature and vice versa.

The third and final stage of the preparation of the cationic resins useful in this invention is the condensation of the amino base complexed salt with at least one mole of formaldehyde preferably from about 1 to 10 moles, to produce the water soluble cationic resinous complex of this invention. This condensation reaction is preferably carried out in the presence of water.

In producing the cationic resins useful in this invention, any mole ratio greater than one mole of formaldehyde per mole of the amino base complexed salt may be utilized. The amount of formaldehyde can be varied depending upon the properties of the cationic resin desired and the nature of the amino base used. This is true since it has been found that by increasing the amount of formaldehyde, the hydrophilic properties of the cationic resin is increased with a corresponding decrease in the cationic activity. This reaction may be carried out at temperatures of from about 90° to 110° C. or higher for a period of from about 1 to about 10 hours. The time may be decreased, as is well known, by increasing the temperature and vice versa. Higher heating temperatures and times may be used in some cases.

Cationic resins useful in this invention are clear, light viscous aqueous solutions. Solid cationic resins can be easily recovered from the aqueous solution by any conventional drying means such as spray drying, oven drying or drum drying. The final dried cationic resin is a white powder which can be easily dissolved in water at room temperature.

By the term formaldehyde as used in the specification and claims, I mean any compound capable of liberating formaldehyde such as paraformaldehyde, trioxane, etc. While formalin, which is an approximately 37% by weight aqueous solution of formaldehyde is preferably employed, formaldehyde or any compound liberating formaldehyde, as, for example, paraformaldehyde, trioxane, etc., may be used.

The strong cationic properties as well as the water stability of cationic resins useful in this invention makes them particularly valuable in precipitating or inactivating anionic surfactants or dispersants. This property makes these cationic resins particularly useful as coagulants in breaking resin and rubber dispersions or emulsions. Hence, an outstanding use of these cationic resins is as coagulants in the production of latex rubber. In the preparation of latex rubber, the latex produced by emulsion is dispersed or emulsified in water due to the anionic surfactants which are utilized in its preparation. Generally, after the latex is produced by emulsion polymerization, removal of the latex from its water dispersion or emulsion is accomplished with great difficulty. By utilizing the cationic resins in the processes disclosed in this invention, one can easily recover the latex from its water emulsion or dispersion since these cationic resins break the emulsion or dispersion by precipitating out the anionic surfactants which hold the latex in an emulsion or dispersion. Therefore by utilizing these cationic resins in the process of this invention, latex rubber is easily recovered from a water dispersion or emulsion.

The strong cationic properties of the cationic resin used in the processes of this invention make them useful as beater additives when used in conjunction with resins or polymeric materials, dispersed in water by means of anionic dispersants in the process of treating cellulosic pulp with resins or polymeric materials. Due to the cationic properties of the resins used in this invention, the resins or polymeric materials are uniformly deposited on the cellulosic pulp. In this manner an improved paper is produced having a smooth finish and a uniform appearance.

Advantageously, the cationic resins used in this invention are water soluble and maintain their stability in water even under acidic conditions. They have very good penetrating properties which make them very useful as fillers in treating materials which are penetrable or porous in nature such as leather, paper, fabrics, etc. A water solution of said cationic resin is applied to said porous or penetrable material whereby said resin adheres to said material and fills the pores, thus producing a smooth finish to said material.

An outstanding use of the cationic resins in the processes of this invention is a coagulant in systems utilizing anionic surfactants and detergents. In the wash or waste waters from such systems, a small amount of anionic surfactants remains in the waste or wash water from the process. This waste water has proven a problem since the anionic surfactants and detergents contained therein cannot be easily removed from the wash water. In many cases, anionic detergents poison the sewerage system into which they are deposited since these materials are not destroyed by bacterial action. The products used in the processes of this invention act as coagulants for the elimination of these anionic surfactants and detergents from waste wasters by precipitating these surfactants and detergents from the waste or wash water system.

DESCRIPTION OF THE PREFERRED EMBODIMENTS

For a fuller understanding of the nature and objects of this invention, reference may be had to the following examples which are given merely as a further illustration of the invention and are not to be construed in a limiting sense.

Example I

This example is directed to preparing a stable cationic resin useful in the process of this invention.

62 lbs. of boric acid (one mole), 100 lbs. of water and 68 lbs. of an aqueous solution containing 25% by weight of ammonia (one mole) were mixed together in a glass-lined kettle equipped with a heating mantle and heated to a temperature of about 75° C. At this temperature, 81.5 lbs. of an aqueous solution containing 37% by weight of formaldehyde (one mole) was introduced into the kettle and heated. Heating was continued at this temperature for about 30 minutes so as to produce the methylol amine salt. After this period, 84 lbs. of dicyandiamide (one mole) was added to the reaction kettle and refluxing was carried out at a temperature of 80° C. for a period of one-half hour so as to react all the methylol amine salt with the dicyandiamide. After this period 244.5 lbs. of an aqueous solution containing 37% by weight of formaldehyde (3 moles) was slowly introduced into the kettle. In about 15 minutes all of the formaldehyde was introduced into the kettle. After this addition, the reaction was continued under constant stirring, by refluxing, for four hours at a temperature of about 92° C. After this period, the reaction product was cooled to room temperature. The cooled reaction product was in the form of a clear resinous solution at room temperature. This reaction product was spray dried. The final dried product was a white powder which was easily soluble in water at 20° C.

Example II

This example is directed to preparing a stable cationic resin useful in the process of this invention.

124 lbs. of boric acid (two moles), 200 lbs. of water and 136 lbs. of an aqueous solution containing 25% by weight of ammonia (two moles) were mixed together in a glass-lined kettle equipped with a heating mantle and heated to a temperature of about 75° C. At this temperature 326 lbs. of an aqueous solution containing 37% by weight of a formaldehyde (4.0 moles) was introduced into the kettle and heating was continued at this temperature for one hour so as to produce the methylol amine salt. After this period, 168 lbs. of dicyandiamide (two moles) was added to the reaction kettle and was refluxed at a temperature of 93° C. for a period of one hour so as to react all the methylol amine salt with the dicyandiamide. After this period 652 lbs. of an aqueous solution containing 37% by weight of formaldehyde (8.0 moles) was slowly introduced into the kettle. In about 15 minutes all of the formaldehyde was introduced into the kettle. After this addition, the reaction was continued under constant stirring, by refluxing, for four and one-half hours at a temperature of from about 92° C. After this period, the reaction product was cooled to room temperature. The cooled reaction product was in the form of a clear resinous solution at room temperature. This reaction product was spray dried. The final dried product was a white powder which was easily soluble in water at 20° C.

Example III

This example is directed to preparing a stable cationic resin useful in the process of this invention.

126 lbs. of ammonium formate (two moles) and 300 lbs. of water were mixed together n a glass-lined kettle equipped with a heating mantle and heated to a temperature of about 70° C. At this temperature, 163 lbs. of an aqueous solution containing 37% by weight of formaldehyde (two moles) were introduced into the kettle and heated at a temperature of about 75° C. for 30 minutes so that all of the formaldehyde reacted with the ammonium formate. After this period, 84 lbs. of dicyandiamide (one mole) was added to the reaction kettle and was refluxed at a temperature of 98° C. for a period of two and one-half hours. After this period, 163 lbs. of an aqueous solution containing 37% by weight of formaldehyde (two moles) was slowly introduced into the kettle. In about 15 minutes all of the formaldehyde was introduced into the kettle. After this addition, the reaction was continued under constant stirring, by refluxing, for four hours at a temperature of from about 90° to 94° C. After this period, the reaction product was cooled to room temperature. The cooled reaction product was in the form of a clear resinous solution at room temperature. This reaction product was spray dried. The spray dried product was a white powder which was easily soluble in water at 20° C.

Example IV

This example is directed to preparing a stable cationic resin useful in the process of this invention.

218 lbs. of an aqueous solution containing 70% by weight of hydroxy acetic acid (two moles) and 136 lbs. of an aqueous solution containing 25% by weight of ammonia (two moles) were mixed together in a glass-lined kettle equipped with a heating mantle and heated to a temperature of about 75° C. At this temperature, 163 lbs. of an aqueous solution containing 37% by weight of formaldehyde (two moles) were introduced into the kettle and heated for 30 minutes at a temperature of about 70° C. to form the methylol amine salt. After this period, 168 lbs. of dicyandiamide (two moles) was added to the reaction kettle and was refluxed at a temperature of 93° C. for a period of one-half hour to react all of the methylol amine salt with dicyandiamide. After this period, 163 lbs. of an aqueous solution containing 37% by weight of formaldehyde (two moles) were slowly introduced into the kettle. In about 15 minutes all of the formaldehyde was introduced into the kettle. After this addition, the reaction was continued under constant stirring, by refluxing, for four hours at a temperature of from about 92° C. After this period, the reaction product was cooled to room temperature. The cooled reaction product was in the form of a clear resinous solution at room temperature. This reaction product was spray dried. The spray dried product was a white powder which was easily soluble in water at 20° C.

Example V

This example is directed to preparing a stable cationic resin useful in the process of this invention.

132 lbs. of ammonium sulfate (one mole) and 300 lbs. of water were mixed together in a glass-lined kettle equipped with a heating mantle and a reflux condenser and heated to a temperature of about 70° C. At this temperature, 163 lbs. of an aqueous solution containing 37% by weight of formaldehyde (two moles) were introduced into the kettle and heated at a temperature of about 75° C. for 20 minutes so that all of the formaldehyde reacted with the ammonium sulfate. After this period, 84 lbs. of dicyandiamide (one mole) was added to the reaction kettle and was refluxed at a temperature of 85° C. for a period of about 15 minutes. After this period, the reaction was completed by heating the contents of the kettle to a temperature of 95° C. for an additional period of four hours. After this period, 163 lbs. of an aqueous solution containing 37% by weight of formaldehyde (two moles) was slowly introduced into the kettle. In about 15 minutes, all of the formaldehyde was introduced into the kettle. After this addition, the reaction was continued under constant stirring by refluxing for four hours at a temperature of from about 95° C. to 100° C. After this period, the reaction product was cooled to room temperature. The cooled reaction product was in the form of a clear resinous solution at room temperature. The pH of the solution containing the reaction product was about 2.0. This reaction product was spray dried. The spray dried product was a white powder which was easily soluble in water at 20° C.

Example VI

This example demonstrates the use of the cationic resin of Example I as a coagulant for removing surface active agents from waste water.

10 ml. of an aqueous solution containing 0.03 gram of the cationic resin of Example I was slowly added to a flask containing 240 ml. of waste water, obtained from the production of latex. The waste water contained 0.4 grams of water by means of a Lightning agitator. The dissolved therein. After all of the solution containing the cationic resin of Example I was added to the flask, a blue precipitate formed. This precipitate adhered to the wall of the flask. The flask was then vigorously shaken for about one minute. A few seconds after the shaking was stopped, part of the precipitate settled out of the water and part still adhered to the wall of the flask. In this manner the sodium lauryl sulfate was removed from the water as a precipitate.

Example VII

This example is directed to showing the use of the cationic resin of this invention as coagulant for rubber emulsions and a comparison of the cationic resin of this invention with a well known latex coagulant.

250 grams of dry pulp was disintegrated in 12,500 grams of water by means of a Lightning agitator. The disintegrated pulp-water mixture was then agitated by means of a beater to a freeness of 600 Canadian Freeness. The freeness was determined by means of TAPPI Standard Freeness Test No. T–227. The pulp-water mixture was then thickened to a consistency of 5.5%, by weight of dry pulp, by means of drawing some of the water through a wire screen. From this pulp-water mixture having a consistency of 5.5% by weight of dry pulp, there was drawn off two aliquot samples each weighing 102 grams and each having a consistency of 5.5% by weight of dry pulp. To each of the samples there was added 13.4 grams of Hycar 1562 (an acrylonitrile latex).

In the first aliquot sample, aliquot portion (1) there was added 3 grams of the solid aminoplast cationic resin produced in Example I.

In the second aliquot sample, aliquot portion (2) there was added 5 grams of aqueous solution containing 10% alum (a known latex coagulant).

From a comparison of the two samples it was noticed that the latex onto the pulp more completely deposited on the pulp in aliquot portion (1) where the complex of this invention was used as a coagulant as compared to aliquot portion (2) where a standard coagulant such as alum was used. It was also noted that the water in aliquot portion (1) where the complex of this invention was used was clear whereas in aliquot portion (2) where alum was used the wash water was white and scummy. This indicated that not all of the rubber latex had precipitated in aliquot portion (2) by the addition of alum whereas after the addition of the cationic resin of Example I, all of the rubber latex had precipitated from the water leaving clear water.

What is claimed is:
1. A process for coagulating polymeric materials from an aqueous dispersion which comprises adding to said dispersion a coagulating amount of cationic resin characterized by being easily dried from solutions thereof at elevated temperatures without materially affecting water solubility and molecular structure thereof which is the condensation product of
   (A) at least one mole of formaldehyde with
   (B) one mole of a complex salt product which is the reaction product of
      (1) an amino base selected from the group consisting of dicyandiamide, ammeline, guanamines, guanidine, and melamine, with,
      (2) a methylolated amine salt, which is the reaction product of formaldehyde with a nitrogen-containing salt selected from the group consisting of ammonium salts of carboxylic acids, ammonium salts of inorganic mineral acids, alkyl mono-amine salts of carboxylic acids containing at least one reactive hydrogen attached to the nitrogen and alkyl mono-amine salts of inorganic mineral acids containing at least one reactive hydrogen attached to the nitrogen, said formaldehyde being present in an amount sufficient to react with one of the active hydrogens on all of said nitrogen atoms contained within said salt.

2. The process of claim 1 wherein said amino base is dicyandiamide.

3. The process of claim 1 wherein said resin is the condensation product of from about 1 to about 10 moles of formaldehyde (A) and one mole of said complex salt product (B).

4. The process of claim 1 wherein said nitrogen containing salt is the ammonium salt of an inorganic mineral acid.

5. The process of claim 1 wherein said nitrogen containing salt is the ammonium salt of a carboxylic acid.

6. The process of claim 1 wherein said dispersion comprises latex and sodium lauryl sulfate.

7. The process of claim 1 wherein said dispersion comprises an acrylonitrile latex and a cellulosic pulp.

8. The process of claim 1 wherein said dispersion comprises an acrylonitrile latex.

References Cited

UNITED STATES PATENTS 3,367,918    2/1968    Lesinski et al. _____ 210—54 X

MICHAEL E. ROGERS, Primary Examiner

U.S. Cl. X.R.

162—167; 260—72, 821